United States Patent
Barlet-Gouedard et al.

(10) Patent No.: US 8,091,642 B2
(45) Date of Patent: Jan. 10, 2012

(54) CEMENT COMPOSITION FOR CARBON DIOXIDE SUPERCRITICAL ENVIRONMENT

(75) Inventors: Véronique Barlet-Gouedard, Chatenay Malabry (FR); Simon James, Le Plessis-Robinson (FR); Bruno Drochon, Missouri City, TX (US); Bernard Piot, Montrouge (FR); Caritey Jean-Philippe, Le Plessis Robinson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 772 days.

(21) Appl. No.: 12/067,823

(22) PCT Filed: Sep. 25, 2006

(86) PCT No.: PCT/EP2006/009288
§ 371 (c)(1), (2), (4) Date: Sep. 29, 2008

(87) PCT Pub. No.: WO2007/039168
PCT Pub. Date: Apr. 12, 2007

(65) Prior Publication Data
US 2009/0126930 A1    May 21, 2009

(30) Foreign Application Priority Data
Sep. 29, 2005 (EP) .................. 05292035

(51) Int. Cl.
*E21B 33/13* (2006.01)

(52) U.S. Cl. ........................ 166/293; 166/276
(58) Field of Classification Search .............. None
See application file for complete search history.

(56) References Cited

U.S. PATENT DOCUMENTS

| | | | |
|---|---|---|---|
| 5,690,729 A | 11/1997 | Jones, Jr. et al. | |
| 5,900,053 A | 5/1999 | Brothers et al. | |
| 2004/0144537 A1* | 7/2004 | Reddy et al. | 166/292 |

FOREIGN PATENT DOCUMENTS

| | | |
|---|---|---|
| GB | 2247234 | 2/1992 |
| GB | 2387593 | 10/2003 |
| WO | 92/19568 | 11/1992 |
| WO | 01/09056 | 2/2001 |
| WO | 01/87797 | 11/2001 |
| WO | 2005/047212 | 5/2005 |

* cited by examiner

*Primary Examiner* — Zakiya W Bates
(74) *Attorney, Agent, or Firm* — Myron K. Stout; Robin Nava; David Cate

(57) ABSTRACT

A cement composition resistant to carbon dioxide includes a hollow element for trapping carbonation products. The hollow element can be hollow spherical or quasi spherical particles including cenospheres, sodium-calcium-borosilicate glass microspheres, silica-alumina microspheres, or a combination thereof. Or the hollow element may be a spherical or quasi spherical void made in the set cement, for example by foaming the cement composition with a gas such as air, nitrogen or a combination thereof. The composition may be used to cement a subterranean well in which carbon dioxide is injected, stored or produced.

14 Claims, 5 Drawing Sheets

Figure 2A
Figure 2B
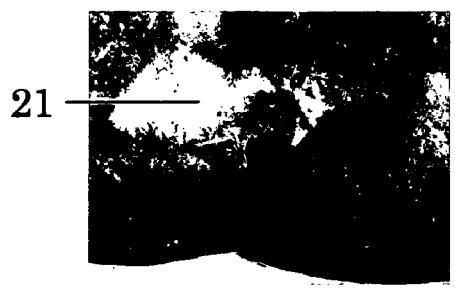
Figure 2C
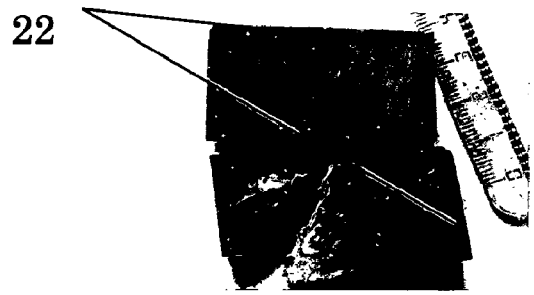
Figure 2D
Figure 2E
Figure 2F
Figure 2G
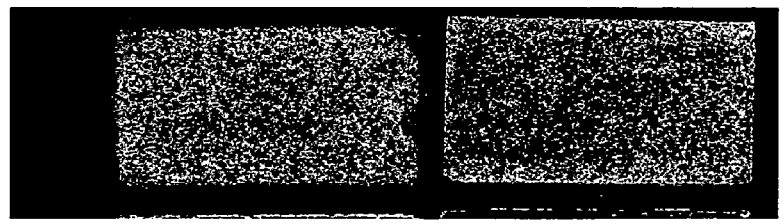
Figure 2H
Figure 2

32

CEMENT COMPOSITION FOR CARBON DIOXIDE SUPERCRITICAL ENVIRONMENT

FIELD OF THE INVENTION

The present invention broadly relates to well cementing. More particularly the invention relates to a cement composition and related method of cementing for carbon dioxide supercritical environment, such as for instance a reservoir for storage of carbon dioxide gas.

DESCRIPTION OF THE PRIOR ART

Earth's atmospheric carbon dioxide [$CO_2$] content increases as a result of both natural and man-made emissions. This $CO_2$ remains in the atmosphere for several decades, and is slowly removed by natural sinks (oceans, vegetation and soils) that store $CO_2$ for an indefinite period of time. Nevertheless, it has become clear to many scientists that humans must work to diminish anthropogenic effects, primarily those derived from burning fossil fuels. Fossil fuels produce a large amount of $CO_2$ emission (40% in mass for coal). Innovative ways to reduce $CO_2$ emission and their impact on the climate and environment are under development, but actually most conceivable plans are solutions to capture and store $CO_2$ emissions—also called $CO_2$ sequestration—, but will require extensive investment in infrastructure and considerable measures to reduce its cost. The separation and compression of $CO_2$ from emission streams remain the most expensive part of the process and can occur before or after the combustion process. Currently, the most widely used process is based on chemical absorption to capture $CO_2$ from flue gas. For the storage part, there are several ways of storing $CO_2$: deep ocean, saline reservoirs, depleted oil reservoirs, depleted gas reservoirs, coal reservoir. Ocean storage, represents the largest potential for carbon storage, but is thought to carry a higher level of environmental risk. The remaining four are geologic storage options, of which the largest capacity is estimated to be in saline aquifers (10,000 billion metric tons carbon). The annual global $CO_2$ emissions in the year 2000 were 6.2 billion metric tons.

Therefore given its vast experience in reservoir management and its extensive range of technologies, the oil and gas industry is poised to take a leading role in the storage of $CO_2$ in geological formations, such as depleted reservoirs, deep saline aquifers and coal reservoirs. Geological storage of $CO_2$ will be more efficient if it is in supercritical conditions. Carbon dioxide has a low critical temperature of 31° C. and a moderate critical pressure of 73.8 bars. Generally, this means that storage depths of 600 m or deeper are required. The storage of $CO_2$ in the subsurface requires various technologies and types of expertise to characterize the storage zone and surrounding strata, to drill and accurately place wellbores, to design and construct surface facilities, to monitor wells and fields, and to optimize systems.

In the construction of wells, cement is used to secure and support casing inside the well and prevent fluid communication between the various underground fluid-containing layers or the production of unwanted fluids into the well. Long-term isolation and integrity of $CO_2$ injection wells clearly needs to be improved to ensure long-term environmental safety. Failure of the cement in the injection interval and above it may create preferential channels for carbon dioxide migration to the surface. This may occur on a much faster timescale than geological leakage. $CO_2$ injection well construction starts with drilling followed by well completion before starting $CO_2$ injection operations. In the framework of well completion, the cementation phase guarantees well isolation from the reservoir to the surface and isolation between geological formations. A crucial technical problem in $CO_2$ sequestration is the chemical resistance of cement to $CO_2$ over time. In $CO_2$ storage, carbon dioxide has to be kept in supercritical conditions at all times. Conventional Portland cement based systems, used during the well cementation phase, are known not to be stable in $CO_2$ rich environments. This type of cement tends to degrade once exposed to such acid gases. Optimization of advanced systems allowing long-term well isolation is critical to allow safe and efficient underground storage sites for carbon dioxide and thus keep the greenhouse gas out of the atmosphere for long duration. Today, the cement durability over hundred years is not known. It is however known that, in processes involving the injection of non-anthropogenic $CO_2$ for Enhanced Oil Recovery (EOR), a number of failures have been reported due to cement performance.

As said, Portland cement based binders are thermodynamically unstable in a $CO_2$ environment. As $CO_2$ laden water diffuses into the cement matrix, the dissociated acid is free to react with the free calcium hydroxide and the calcium silicate hydrate gel (CSH gel). The final reaction products are soluble and migrate out of the cement matrix. As result, the compressive strength of the set cement decreases and the permeability increases, leading to the loss of zonal isolation.

As the degradation of Portland cement in a $CO_2$ environment starts by the reaction with calcium hydroxide, the first cement systems that have been commercialized for $CO_2$ producing or injecting wells used initially a blend of Portland cement with a type-C or type-F pozzolan. In both cases, the pozzolan reacts with the calcium hydroxide liberated by the hydration of cement, and forms calcium alumino-silicates. These cement-pozzolan blends do offer some slight improvement for short term resistance to degradation by $CO_2$, and as such have been used in many $CO_2$ flood system that occurred at low temperature, where perfectly dry $CO_2$ is injected. But on the long term, these systems still degrade as the $CO_2$ also attacks the calcium silicate phases, though at a lower pace. In presence of water and/or at higher temperatures, these cement-pozzolan blends degrade quickly.

Another option that has been used in the civil engineering and building industry for reducing the attack of $CO_2$ on Portland cement consists of making the set cement less permeable by mainly reducing its water content. However this solution only slows down the process at ambient conditions, as on the long term the silicates are still degraded.

Epoxy resins have been proposed as a possible solution to solve the isolation problems in $CO_2$ rich conditions, as they are known to resist degradation in highly corrosive saline environments even at high temperatures. Epoxy resins have been tested by the applicants and these results show that epoxy resin even with a silica charge are deteriorated after 31 days at 90° C. (194° F.) and 280 bars (4 kPSI).

U.S. Pat. Nos. 5,900,053 and 6,143,069 disclose a calcium aluminate/phosphate system intended for high temperature saline geothermal wells, and for wells containing a certain percentage of $CO_2$, but not for wells whose effluents is only $CO_2$. Furthermore, $CO_2$ sequestration wells are cooler than geothermal wells, usually less than 93° C. (200° F.) and no published information is present on the durability of those systems at these temperatures.

U.S. Pat. No. 6,911,078 discloses a cement system based on a Portland cement, silica and alumina, with the mineralogical composition of the cement matrix included in the Si—Ca—Al triangle of predetermined resistant phases. The system is intended for very high temperature and geothermal cementing in wells containing corrosive brines and carbon dioxide. However the system has been found limited to wells whose temperature exceeds 232° C. (450° F.) and no published information is present on the durability of those systems at lower temperatures.

Hence, it remains the need of a cement composition intended for use in $CO_2$ injection wells or storage reservoirs and in a supercritical $CO_2$ conditions.

SUMMARY OF THE INVENTION

The present invention discloses a cement composition resistant to carbon dioxide including a hollow element for trapping carbonation products. The carbonation products mean products from precipitation and/or calcium carbonate and/or carbonate minerals.

The hollow element can be an additional component added to the cement composition, this component is made of hollow spherical or quasi spherical particles as cenospheres, sodium-calcium-borosilicate glass, silica-alumina microspheres, or a combination thereof. Or the hollow element is a spherical or quasi spherical void made in the set cement, for example by foaming the cement composition with a gas as air, nitrogen or a combination thereof.

Preferably, the cement composition is a pumpable slurry for well cementing applications and especially for carbon dioxide injection and/or producing well applications. So, the particle size of the materials has been selected and the respective proportion of particles fractions has been optimized in order to have the highest Packing Volume Fraction (PVF) of the solid allowing a high Solid Volume Fraction (SVF) of 50-60% to be used whilst still having a pumpable slurry.

Preferably, the cement composition is metakaolin based cement slurry (silicoaluminous particles). The decrease of conventional cement versus metakaolin based cement induces a better chemical stability with $CO_2$ supercritical fluid.

Preferably, the cement composition is blast furnace slag based cement slurry. Also the decrease of conventional cement versus blast furnace slag based cement induces a better chemical stability with $CO_2$ supercritical fluid. The metakaolin based cement and blast furnace slag based cement can be used together, enhancing moreover the chemical stability.

In another aspect of the invention, the cement composition comprises further weighting particles having a first average particle size and lightweight particles having a second average particle size and the density of the cement slurry is adjusted by tuning the proportion of weighting particles and lightweight particles at constant solid volume fraction. In one embodiment, the first average particle size and second average particle size are identical or substantially identical; in a second embodiment, the first average particle size and second average particle size are different. In this way, the cement composition is optimized at constant solid volume fraction for various densities by adjusting the ratio between lightweight particles and weighting particles of different size. Preferably, the lightweight particles are also the hollow elements such as: cenospheres, sodium-calcium-borosilicate glass, silica-alumina microspheres, or a combination thereof.

According to the invention use of the cement composition as listed below in carbon dioxide applications are disclosed.

In another aspect of the invention, a method is disclosed to cement a part of a borehole that will be exposed to carbon dioxide, said method comprising: (i) providing a cement slurry made of cement composition as disclosed above, (ii) placing the cement slurry in the part of the borehole to be cemented, (iii) allowing the cement slurry to harden, (iv) exposing the set cement to carbon dioxide.

In another aspect of the invention, a method is disclosed to repair a part of a borehole that will be exposed to carbon dioxide, said method comprising: (i) providing a cement slurry made of cement composition as disclosed above, (ii) placing the cement slurry in the part of the borehole to be repaired, (iii) allowing the cement slurry to harden, (iv) exposing the set cement to carbon dioxide.

In another aspect of the invention, a method is disclosed to plug a part of a borehole that will be exposed to carbon dioxide, said method comprising: (i) providing a cement slurry made of cement composition as disclosed above, (ii) placing the cement slurry in the part of the borehole to be plugged, (iii) allowing the cement slurry to harden. In another embodiment, the method comprises further exposing the set cement to carbon dioxide. Preferably in one embodiment the plug is placed from rock to rock; in a second embodiment the plug is placed inside casing.

BRIEF DESCRIPTION OF THE DRAWINGS

Further embodiments of the present invention can be understood with the appended drawings.

Family of FIGS. 2A to 2H shows pictures of set cement tested in $CO_2$ supercritical environment.

Figure 3A:
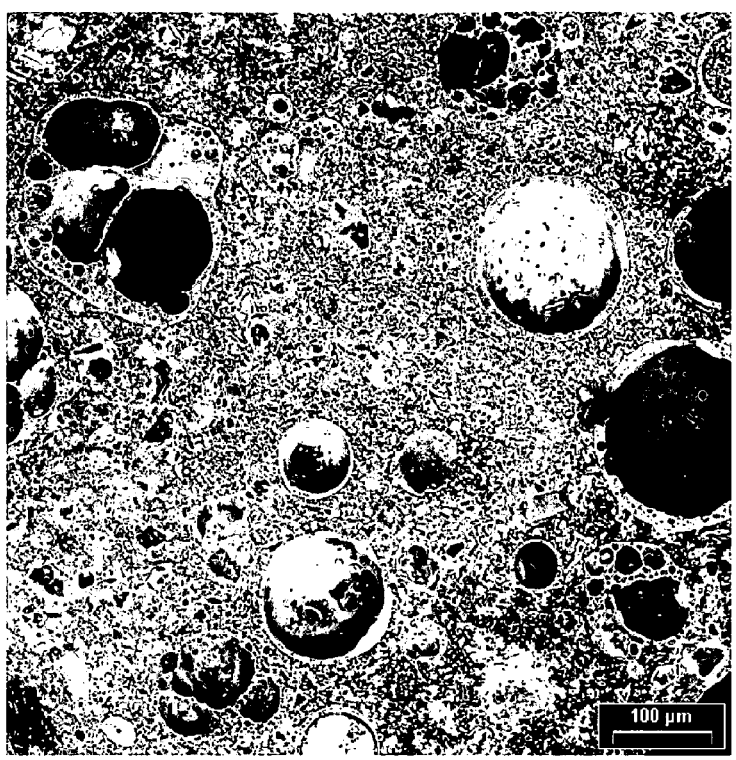
Figure 3A:
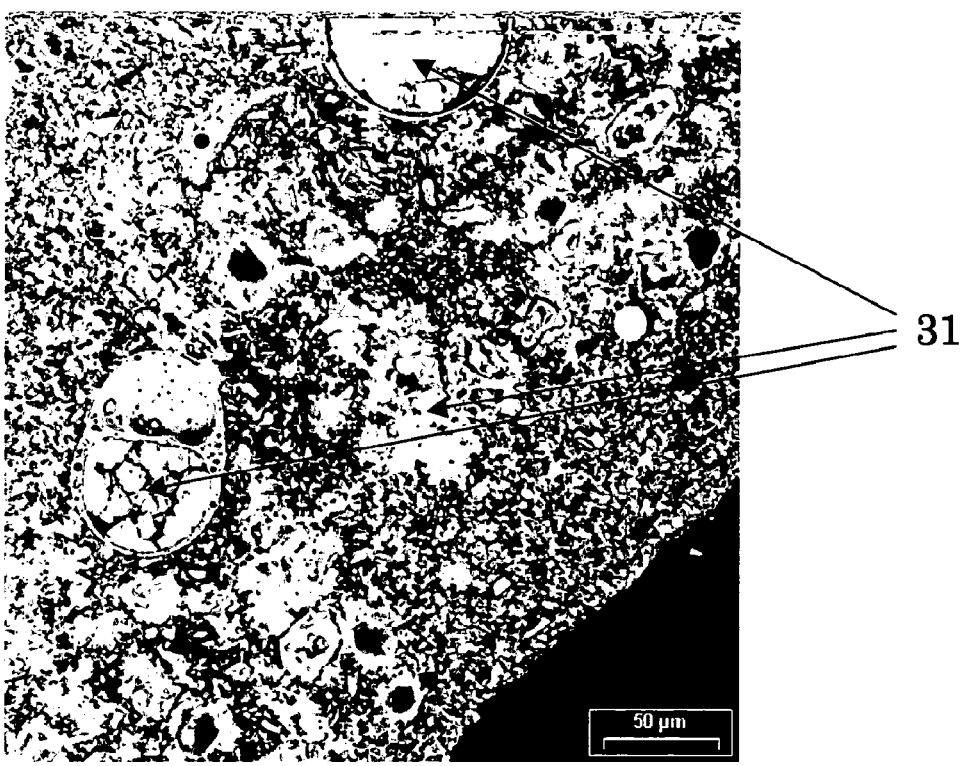

FIG. 3A shows micrographs made with backscattered scanning electron microscope (SEM-BSE) for set cement according to one embodiment tested in wet supercritical $CO_2$ fluid.

Figure 3B:
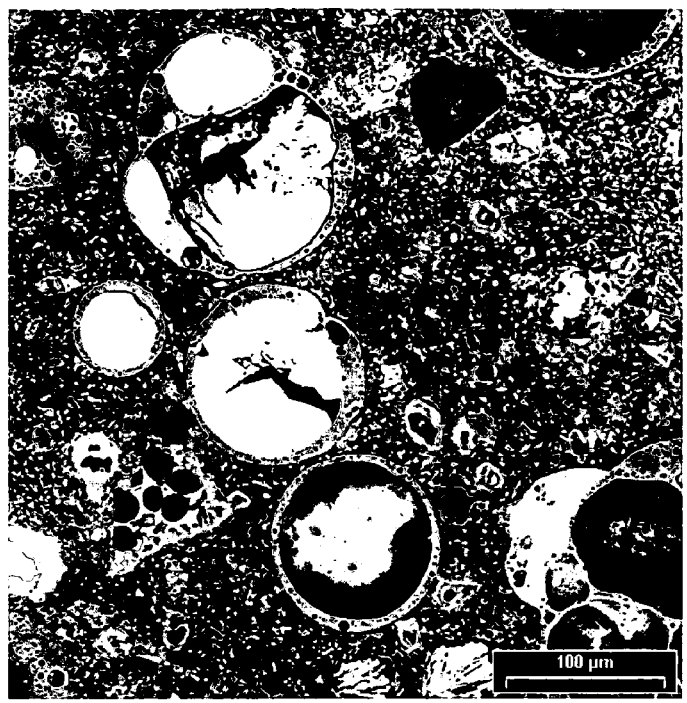
Figure 3B:
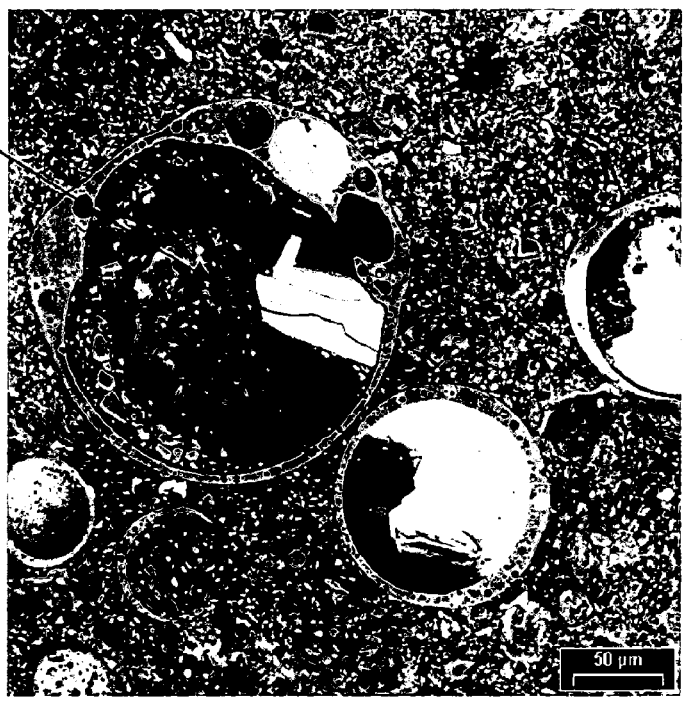

FIG. 3B shows micrographs made with backscattered scanning electron microscope (SEM-BSE) for set cement according to one embodiment tested in water saturated by $CO_2$.

Figure 4:
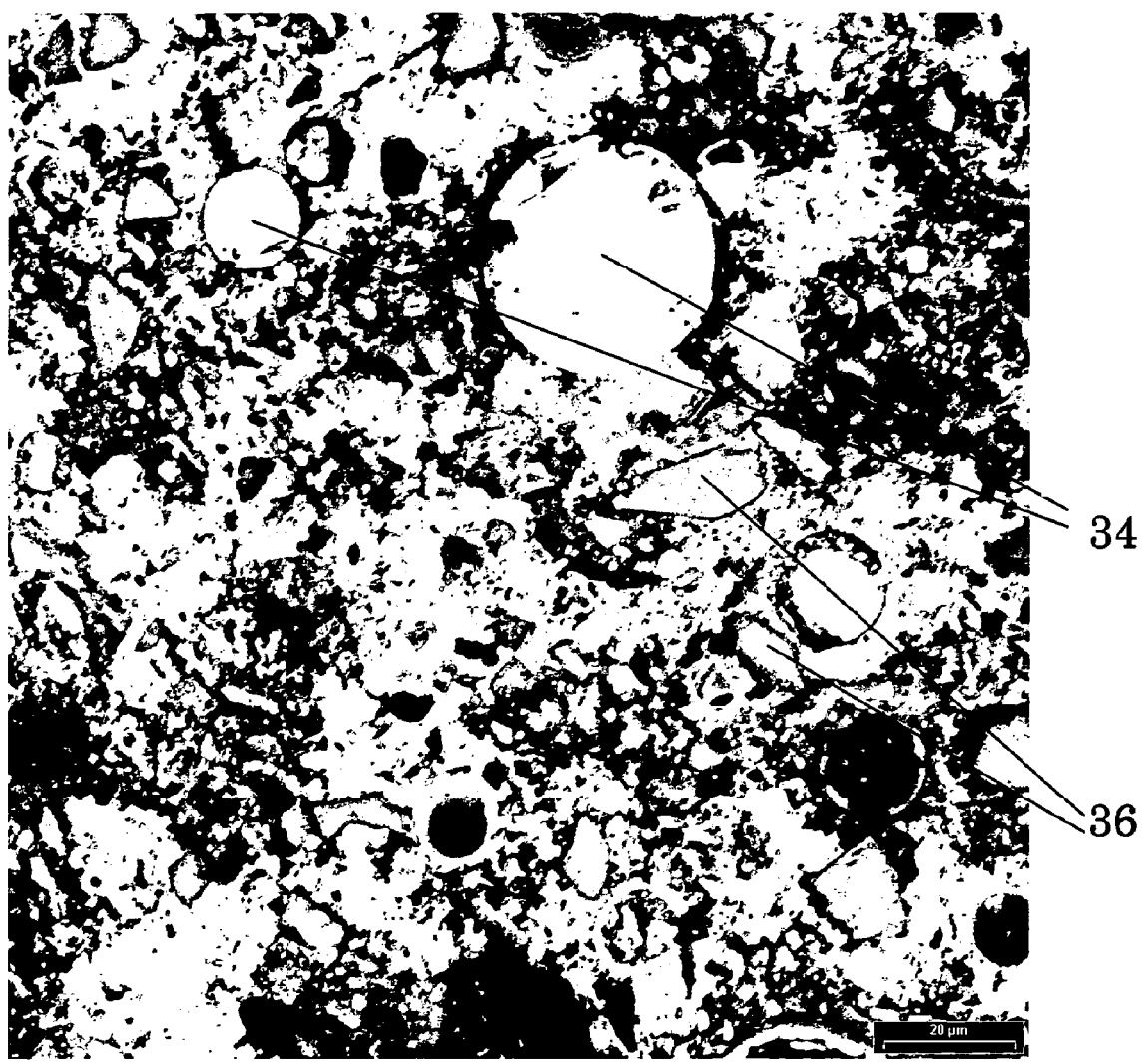

FIG. 4 shows micrographs made with backscattered scanning electron microscope (SEM-BSE) for set cement according to another embodiment tested in water saturated by $CO_2$.

DETAILED DESCRIPTION

Test on Durability of $CO_2$ Resistant Cement

Today, there is no relevant and/or standard test for durability of cements intended for use in $CO_2$ injection wells in supercritical $CO_2$ conditions. U.S. Pat. No. 6,332,921 discloses a test for $CO_2$ durability. For example, API Class G Portland Cement is mixed with 40% silica flour and water to form a cement slurry. The slurry is allowed to set for 24 hours at a temperature of 88° C. (190° F.). Thereafter, the set cement is placed in an aqueous 4% by weight sodium carbonate solution for 28 days at 315° C. (600° F.). This test has a major drawback, the solution only contains 4% of sodium carbonate ($Na_2CO_3$ or $NaHCO_3$). Effectively, this environment is less severe than $CO_2$ fluids met in $CO_2$ injection wells.

Figure 1:
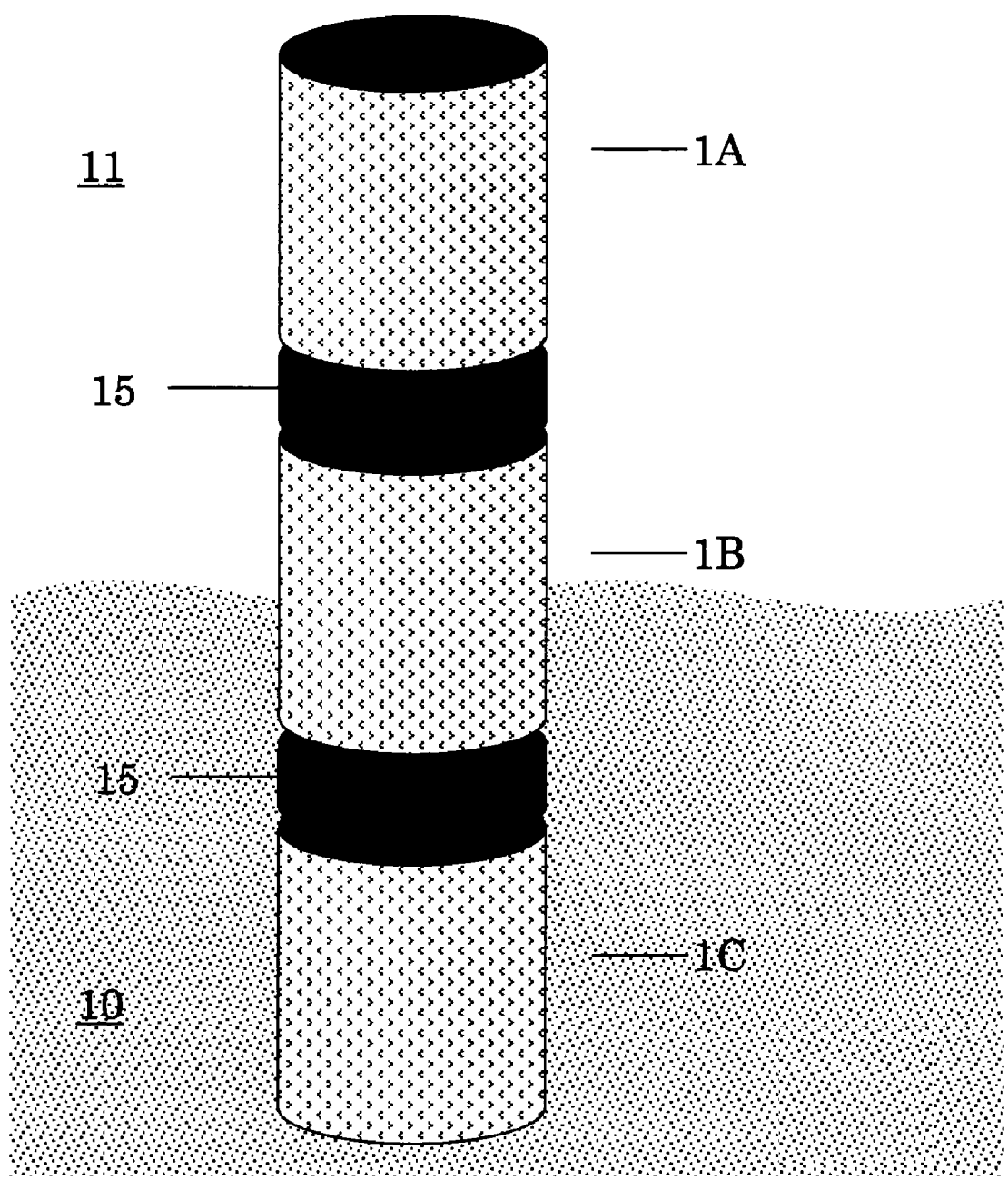
FIG. 1 shows a schematic view of the $CO_2$ supercritical vessel for testing $CO_2$ resistant cement.

Therefore, a new test for $CO_2$ durability has been developed. After mixing of cement slurry is completed; the slurry is placed into cubic moulds and cured 3 days at 90° C. (194° F.). Then the cubic moulds are cored into cylinders (2.5 cm radius, 5 cm length) which are placed into a wet $CO_2$ supercritical vessel for degradation test during 31 days at 90° C. (194° F.) under 28 MPa (4 kPSI) of fluid pressure composed of 90% by weight of $CO_2$ and 10% by weight of water. Test conditions are always monitored to maintain $CO_2$ in supercritical state. FIG. 1 is a schematic view of the $CO_2$ supercritical vessel. Three cores, one at the bottom (1C), one at the middle (1B) and last at the top (1A) of the reactor are isolated by polytetrafluoroethylene (PTFE) slices (15). The three cores allow testing $CO_2$ resistance to two types of fluid, a first fluid (11) composed by $CO_2$ supercritical phase saturated by water, and a second fluid (10) composed by water phase saturated by $CO_2$. The first core (1A) is only in contact with first fluid (11), the second core (1B) is in contact with first (11) and second (10) fluid to analyze the interface and the third core (1C) is only in contact with second fluid (10).

The here mentioned test will be used below to test the $CO_2$ resistant cement and will be called the test for $CO_2$ durability Test 1 made in the first fluid and Test 3 made in the first/second fluid and Test 2 made in the second fluid.

$CO_2$ Resistant Cement

As mentioned above, for wells containing carbon dioxide such as $CO_2$ injection wells generally require the use of well cement compositions which do not deteriorate in the presence of carbon dioxide containing brines. The static bottom hole temperature for these wells is below 93° C. (200° F.). Normally, carbonation of conventional cements causes dissolution of the cement which is converted into water-soluble salts. Further, severe corrosion of steel pipe takes place thereby resulting in the total disruption of the conventional cements. The reactions occurring in conventional cements are:

$$CO_2 + H_2O \rightarrow H_2CO_3 \quad \text{(Equation 1)}$$

$$H_2CO_3 + C\text{—}S\text{—}H\ gel \rightarrow silica\ gel + CaCO_3 \quad \text{(Equation 2)}$$

$$H_2CO_3 + Ca(OH)_2 \rightarrow CaCO_3 + 2H_2O \quad \text{(Equation 3)}$$

$$H_2CO_3 + CaCO_3 \rightarrow Ca(HCO_3)_2 \quad \text{(Equation 4)}$$

And finally, the equilibrium reaction occurring between carbon dioxide, water and calcite (Equation 4) can be written:

$$CO_2 + H_2O + CaCO_3 \leftrightarrow H^+ + HCO_3^- + CaCO_3 \leftrightarrow 2H^+,\ CO_3^{2-} + CaCO_3 \leftrightarrow (Ca^{2+}, (OH^-)_2 + 2H^+,\ CO_3^{2-}) \leftrightarrow Ca(HCO_3)_2 \quad \text{(Equation 5)}$$

By adding carbon dioxide to water, the equation 5 is displaced to the right and bicarbonate is formed and can migrate out of the cement matrix as ions ($Ca^{2+}$, $(OH^-)_2 + 2H^+$, $CO_3^{2-}$) or bicarbonate. So, equations 1 and 2 in turn are displaced to the right consuming calcium hydroxide and the calcium silicate hydrate gel and destructing more and more the cement matrix.

During tests for CO2 durability the inventors have surprisingly noted that to improve cement durability a hollow element or a void can be placed in the cement composition to act as a trapping agent for calcium carbonate. The hollow element or void provides a lower energy state for growth/precipitation of calcium carbonate crystals compared with the much smaller pores present in the cement. Growth of calcite in the hollow beads also reduces the stress on the cement matrix caused by precipitation of the calcium carbonate, thus maintaining the mechanical properties of the system. Therefore, the CO2 resistant cement includes a hollow element for trapping carbonation.

The hollow element can be any type of component comprising hollow spherical or quasi spherical particles. The hollow elements typically have density of less than 2 g·cm$^{-3}$, and generally less than 0.8 g·cm$^{-3}$. By way of example, it is possible to use hollow microspheres, in particular of silico-aluminate, known as cenospheres, a residue that is obtained from burning coal and having a mean diameter of about 150 micrometers. It is also possible to use synthetic materials such as hollow glass beads, and more particularly preferred are beads of sodium-calcium-borosilicate glass presenting high compression strength or indeed microspheres of a ceramic, e.g. of the silica-alumina type.

The hollow element can be also a cavity made inside the set cement composition, for example by foaming the cement composition. The gas utilized to foam the composition can be air or nitrogen being the most preferred. The amount of gas present in the cement composition is that amount which is sufficient to form some holes.

In another embodiment, preferably, for the $CO_2$ resistant cement the particle size of the materials has been selected and the respective proportion of particles fractions has been optimized in order to have the highest Packing Volume Fraction (PVF) of the solid allowing a high Solid Volume Fraction (SVF) of 50-60% to be used whilst still having a pumpable slurry. More details can be found in European patent EP 0 621 247. The cement system can be a "trimodal" combination of particles type: "large" for example sand or crushed wastes (average dimension 200-800 micrometers), "medium" for example materials of the type of hydraulic material, as cement (average dimension 10-20 micrometers) or a cement/slag, "fines" like for example a micromaterial, or some micro fly ashes or calcinated clays or some other micro slags (average dimension 0.5-10 micrometers). The cement system can also be a "tetramodal" combination of particles type: with "large" (average dimension about 200-350 micrometers), "medium" cement (average dimension about 10-20 micrometers), "fine" (average dimension about 1 micrometer), "very fine" (average dimension about 0.1-0.15 micrometer). The cement system can also be a further combinations between the further categories: "very large", for example glass maker sand, crushed wastes (average dimension superior to 1 millimeter) and/or "large", for example sand or crushed wastes (average dimension about 200-800 micrometers) and/or "medium" like a material such as cement or an other hydraulic binder, or crushed wastes (average dimension 10-20 micrometers) and "fine" like, for example, a microcement, or some micro fly ashes or calcinated clays or some other micro slags (average dimension 0.5 micrometer) and/or "very fine" like, for example, some pigments or some polymer microgels like a usual fluid loss control agent (average dimension 0.05-0.5 micrometer) and/or "ultra fine" like some colloidal silica or aluminum (average dimension 7-50 nanometers).

Preferably, for the $CO_2$ resistant cement, the conventional Portland cement is diluted by others materials such as metakaolin (silicoaluminous particles) and silica sands, less reactive with carbon dioxide. This decrease of Portland cement induces a better chemical stability with $CO_2$ supercritical fluid. This new blend Portland/Metakolin allows to reduce the amount of free hydrated lime and modify the chemistry of the calcium silicate and aluminates hydrates, making those less susceptible to be attacked by carbon dioxide; above 232° C. (450° F.), this new blend allows also the formation of anorthite which exhibits a better resistance than xonotlite, to acidic fluid containing $CO_2$ or/and to brines circulation.

Preferably, for the $CO_2$ resistant cement, the conventional Portland cement can be further diluted by others materials as blast furnace slag, less reactive with carbon dioxide. This decrease of Portland cement induces a better chemical stability with $CO_2$ supercritical fluid.

Table 1 shows the composition of a cement composition for supercritical $CO_2$ applications as the $CO_2$ resistant cement according to one embodiment of the invention.

TABLE 1

Composition of low density cement system tested in $CO_2$ fluids

|  | Composition 1 |
| --- | --- |
| Density | 1.55 g·cm$^{-3}$ |
|  | (12.98 ppg) |
| SVF (%) | 51.00 |
| PVF | 0.82 |
| Blend composition (% bvob) | |
| Dyckerhoff Black | 29.82 |
| Silica | 12.68 |
| Metakaolin | 17.00 |
| Hollow microspheres | 40.50 |
| Blend composition (% bwoc) | |
| Dyckerhoff Black | 100.00 |
| Silica | 35.00 |
| Metakaolin | 48.58 |
| Hollow microspheres | 32.90 |
| Mixing Water | Fresh |

The cement composition 1 of 1.6 g·cm$^{-3}$ (13 ppg) has been tested in Test 1 and Test 3. The cement composition contains micro silica, metakaolin to reduce the amount of calcium and a lightweight particle (hollow microspheres). The cement used is a conventional Portland cement (Dyckerhoff Black). Further, a dispersant, a retarder, and a fluid loss control additive can be added to composition 1.

FIGS. 2A to 2D show tests for neat set cement (made of plain conventional Portland cement (Dyckerhoff Black) of 1.89 g·cm$^{-3}$ (15.8 ppg) with a water/cement ratio of 0.44 called composition 0). Further, a dispersant, a retarder, and a fluid loss control additive can be added to composition 0. FIG. 2A is a picture of cement system sample made of composition 0 prior to test. FIG. 2B is a picture of cement system samples made of composition 0 after Test 1 and Test 2. Micro cracks are observed inside samples. Some samples have been destroyed in part after exposure to Test 1. FIG. 2C is a detailed view of cement system samples made of composition 0 after Test 1 and Test 2 showing aragonite formation 21 developed on the sample surface. FIG. 2D is a cutaway of cement system cores made of composition 0, first made in Test 1 (lower cutaway core), second made in Test 2 (upper cutaway core). The carbonation is fairly regular inside the core on a thickness 22 around 6 mm from the outer surface of the core. The magnitude of degradation is already sufficient after one month period of Test 1 and 2 to evaluate the low resistance of cement system made of composition 0.

FIGS. 2E to 2H show tests for set cement made of composition 1. FIG. 2E is a picture of cement system sample made of composition 1 prior to test. FIG. 2F is a picture of cement system sample made of composition 1 after Test 2. FIG. 2G is a picture of cement system sample made of composition 1 after Test 1. A much better resistance to carbonation is observed compared to the samples made of composition 0. No micro cracks are observed after tests. FIG. 2H is a cutaway of cement system cores made of composition 1, first made in Test 1 (left cutaway core), second made in Test 2 (right cutaway core). A good integrity is observed without carbonation front and without micro-cracks within the matrix. Backscattered scanning electron microscopy (SEM-BSE) is used to observe the cement matrix composition and structure.

FIG. 3A shows micrographs made with a backscattered scanning electron microscope (SEM-BSE) of a slice of the cement system core made of composition 1 subjected to Test 1.

FIG. 3B shows SEM-BSE micrographs of a slice of the cement system core made of composition 1 subjected to Test 2.

The carbonate precipitation process is observed well distributed inside the matrix mainly inside the hollow microspheres (31 for FIG. 3A and 32 for FIG. 3B). No carbonation front is present in composition 1, unlike composition 0 where a carbonation front is observed.

In another aspect of the invention, the $CO_2$ resistant cement is optimized at a constant Solid Volume Fraction for various densities by adjusting the ratio between lightweight particles (hollow microspheres) and weighting particles (weighting agent). In this way, a cement composition tested for durability in $CO_2$ environment for one predefined density will have substantially the same features at different densities. The $CO_2$ resistant cement is not only one cement composition with one density but a family of products with different densities. Those skilled in the art will appreciate this essential feature when cementing a well where a large panel of densities is necessary. Table 2 shows the composition of a cement composition for supercritical $CO_2$ applications as the $CO_2$ resistant cement according to another embodiment of the invention with SVF constant and different densities. The cement compositions (2 and 3) contains micro silica, slag cement to reduce the amount of calcium and a lightweight particle (hollow microspheres).

TABLE 2

Composition of $CO_2$ resistant cement system.

|  | Composition 2 | Composition 3 |
| --- | --- | --- |
| Density | 1.90 g·cm$^{-3}$ | 1.5 g·cm$^{-3}$ |
|  | (15.84 ppg) | (12.5 ppg) |
| Porosity (%) | 38 | 38 |
| SVF (%) | 62 | 62 |
| Blend composition (% bvob) | | |
| Slag cement | 25 | 25 |
| Micro silica | 10 | 10 |
| Coarse particle | 52 | 20.8 |
| Hollow microspheres | 13 | 44.2 |
| Blend composition (% bwoc) | | |
| Slag cement | 100 | 100 |
| Micro silica | 28.76 | 28.76 |
| Coarse particle | 180.81 | 72.32 |
| Hollow microspheres | 9.96 | 33.86 |
| Liquid chemicals | | |
| Dispersant | 2.3 mL·kg$^{-1}$ | 5.7 mL·kg$^{-1}$ (0.15 gps of |
|  | (0.06 gps of blend) | blend) |
| Retarder | 1.9 mL·kg$^{-1}$ | 1.9 mL·kg$^{-1}$ (0.05 gps of |
|  | (0.05 gps of blend) | blend) |

Table 3 shows the results for compressive strength evolution for cement compositions for supercritical $CO_2$ applications according to the invention. As it can be seen, the compressive strength is comparable, and the two cement compositions have substantially the same durability in $CO_2$ environment.

TABLE 2

Compressive strength evolution for compositions of $CO_2$ resistant cement system after tests.

|  | Composition 2 | Composition 3 |
|---|---|---|
| $CS_{initial}$ | 40 MPa | 19 MPa |
| CS after test 1 | 31.2 MPa | 23.9 MPa |
| CS after test 2 | 31.9 MPa | 21 MPa |

FIG. 4 shows SEM-BSE micrographs of a slice of the cement system core made of composition 2 subjected to Test 2. The carbonate precipitation process is observed well distributed inside the matrix mainly inside the hollow microspheres 34. Calcium free slag 36 is also observed inside the matrix.

Placement of $CO_2$ Resistant Cement

The methods of the present invention are useful in cementing wells exposed to any significant carbon dioxide, such as for example wet supercritical $CO_2$ injection wells for storage. Placement of the $CO_2$ resistant cement in the portion of the wellbore to be cemented is accomplished by means that are well known in the art of wellbore cementing. Cement is typically placed in a wellbore surrounding a casing to prevent vertical communication through the annulus between the casing and the wellbore or the casing and a larger casing. A cement slurry is typically placed in a wellbore by circulation of the slurry down the inside of the casing, followed by a wiper plug and a nonsetting displacement fluid. The wiper plug is usually displaced to a collar, located near the bottom of the casing. The collar catches the wiper plug to prevent over-displacement of the cement and also to minimize the amount of the cement left in the casing. The cement slurry is circulated up the annulus surrounding the casing, where it is allowed to harden. The annulus could be between the casing and a larger casing or could be between the casing and the borehole. Typically, the casing will be cemented up to the bottom of the next larger casing.

The $CO_2$ resistant cement can also be used in squeeze cementing. The cement slurry is forced through perforations in the casing to the formation and wellbore surrounding the casing. Cement is placed in this manner to repair unconsolidated or insufficiently consolidated wells, for example, when either the original cement fails, or was not initially placed acceptably, or when an injecting and/or a producing interval has to be shut off.

The $CO_2$ resistant cement can also be used as plug. The method to plug a part of a borehole comprises: (i) providing a cement slurry made of cement composition as disclosed above, (ii) placing the cement slurry in the part of the borehole to be plugged, (iii) allowing the cement slurry to harden. In another embodiment, the method comprises further exposing the set cement to carbon dioxide. Preferably in one embodiment the plug is placed from rock to rock; in a second embodiment the plug is placed inside casing.

The invention claimed is:

1. A method of using a cement composition containing hollow elements for trapping carbonation products, wherein:
   (i) the hollow elements comprise cenospheres, sodium-calcium-borosilicate glass microspheres, silica-alumina microspheres or a combination thereof;
   (ii) the cement composition is foamed with at least one as chosen from the list consisting of: air and nitrogen, thereby forming hollow elements;
   or both.

2. The method of claim 1, wherein said cementing composition is further a pumpable slurry for well cementing applications.

3. The method of claim 1, wherein said cement composition is applied to carbon dioxide injection and carbon dioxide production well applications.

4. The method of claim 1, wherein said cement composition is applied to carbon capture and storage wells.

5. The method of claim 1, wherein said hollow elements are spherical, quasi spherical, or both.

6. The method of claim 1, wherein said hollow elements in the set cement are spherical, quasi spherical, or both.

7. The method of claim 1, wherein the cement composition contains metakaolin.

8. The method of claim 1, wherein the cement composition contains blast furnace slag.

9. A method for cementing subterranean well, comprising:
   (i) providing a cement slurry wherein:
      (a) the slurry comprises cenospheres, sodium-calcium-borosilicate glass microspheres, silica-alumina microspheres or a combination thereof,
      (b) the cement slurry is foamed with at least one gas chosen from the list consisting of:
      air and nitrogen,
      or both;
   (ii) placing the cement slurry in the well;
   (iii) allowing the cement slurry to harden; and
   (iv) exposing the cement to carbon dioxide.

10. The method of claim 9, wherein the slurry is used to repair a part of the well.

11. The method of claim 9, wherein the slurry is used to plug a part of the well.

12. A The method of claim 9, wherein the cement slurry contains metakaolin.

13. The method of claim 9, wherein the cement slurry contains blast furnace slag.

14. The method of claim 9, wherein the cement slurry further comprises weighting particles having a first average particle size and lightweight particles having a second average particle size, and wherein the density of the cement slurry is adjusted by tuning the proportion of weighting particles and lightweight particles at a constant solid volume fraction.

* * * * *